United States Patent [19]
Chee

[11] Patent Number: 5,872,998
[45] Date of Patent: Feb. 16, 1999

[54] SYSTEM USING A PRIMARY BRIDGE TO RECAPTURE SHARED PORTION OF A PERIPHERAL MEMORY OF A PERIPHERAL DEVICE TO PROVIDE PLUG AND PLAY CAPABILITY

[75] Inventor: Lawrence Chee, Vancouver, Canada

[73] Assignee: Seiko Epson Corporation, Tokyo, Japan

[21] Appl. No.: 597,661

[22] Filed: Feb. 6, 1996

Related U.S. Application Data

[60] Provisional application No. 60/007,041 Nov. 21, 1995.

[51] Int. Cl.[6] .......................... G06F 12/00; G06F 12/14; G06F 12/02
[52] U.S. Cl. ........................ 395/876; 395/872; 711/117; 711/129; 711/147; 711/153
[58] Field of Search .................................... 395/512, 308, 395/500, 842, 521, 876, 872; 711/153, 203, 120, 1, 3, 117, 129, 147; 707/205

[56] References Cited

U.S. PATENT DOCUMENTS

| | | | |
|---|---|---|---|
| 4,264,953 | 4/1981 | Douglas et al. | 711/3 |
| 4,953,101 | 8/1990 | Kelleher et al. | 395/505 |
| 5,117,350 | 5/1992 | Parrish et al. | 711/1 |
| 5,230,045 | 7/1993 | Sindhu | 711/203 |
| 5,287,485 | 2/1994 | Umina et al. | 711/120 |
| 5,394,545 | 2/1995 | Emrick et al. | 707/205 |
| 5,446,869 | 8/1995 | Padgett et al. | 395/500 |
| 5,450,542 | 9/1995 | Lehman et al. | 345/512 |
| 5,454,107 | 9/1995 | Lehman et al. | 711/153 |
| 5,581,714 | 12/1996 | Amini et al. | 395/308 |
| 5,590,377 | 12/1996 | Smith | 395/842 |

FOREIGN PATENT DOCUMENTS

| | | |
|---|---|---|
| 0 318 259 | 5/1989 | European Pat. Off. . |
| 0 661 637 | 7/1995 | European Pat. Off. . |

OTHER PUBLICATIONS

"Hurricane 2.0 Squeezes the Most Memory from Your System", PC Magazine Oct. 8, 1996 pp. 48.

*Primary Examiner*—Le Hien Luu
*Attorney, Agent, or Firm*—Michael T. Gabrik

[57] ABSTRACT

A system and method recaptures peripheral device dedicated memory for use by other system components such as the CPU. The system comprises a CPU, a preferred primary PCI bridge and at least one peripheral system. The peripheral system comprises a peripheral device, a peripheral memory typically dedicated to the peripheral device, and a peripheral controller for managing peripheral device commands and peripheral memory access requests. The system may further comprise a system memory unit having a system memory and a system memory controller. The preferred primary PCI bridge couples the CPU to the peripheral system(s), determines dedicated and shared memory portions for the peripheral memory, creates a composite memory map, and delivers memory aperture information to each of the peripherals. During runtime, the preferred primary PCI bridge manages dedicated and shared peripheral memory access. Using the memory aperture information, each peripheral controller manages access to its respective peripheral memory.

33 Claims, 5 Drawing Sheets

ND PLAY
SYSTEM USING A PRIMARY BRIDGE TO RECAPTURE SHARED PORTION OF A PERIPHERAL MEMORY OF A PERIPHERAL DEVICE TO PROVIDE PLUG AND PLAY CAPABILITY

PRIORITY REFERENCE TO PROVISIONAL APPLICATION

This application claims benefit of U.S. provisional application entitled "Peripheral Device Memory Recapture," provisional Ser. No. 60/007,401, filed on Nov. 21, 1995, by inventor Lawrence Chee.

BACKGROUND OF THE INVENTION

1. Field of the Invention

This invention relates generally to computer memory, and more particularly to a system and method for recapturing dedicated peripheral device memory, thereby making this memory available for general use by the computer system.

2. Description of the Background Art

Many peripheral devices, such as video displays or graphic accelerators, require random access memory (RAM) to operate. To improve system performance and peripheral device functionality, computer designers typically provide dedicated peripheral RAM for these peripheral devices. This dedicated RAM is generally accessible only by the peripheral device and is not available or reassignable to other system components such as the central processing unit (CPU). However, it is not uncommon for a peripheral device to use only a portion of its dedicated peripheral memory, thereby wasting valuable RAM capacity. For example, a typical desktop computer system has four megabytes of Dynamic RAM (DRAM), or similar RAM such as VRAM, dedicated to the video controller and display. Yet, when displaying about 800 by 600 pixels at eight bits per pixel for color definition alone, the typical high resolution SVGA video monitor uses only about one megabyte of its dedicated memory. Thus, three megabytes of RAM remain unused. Laptop computers require even less dedicated memory due to the physical limitations of liquid crystal displays.

This problem is exacerbated when system designers implement wide databuses for coarse grain information transfer between a peripheral device and the dedicated peripheral memory. To obtain this wide databus and thereby improve system performance, many system designers use several memory chips in parallel, which incidentally provides more memory greater than needed by the peripheral device. With increasing RAM requirements, systems should not squander such valuable resources. Therefore, a system and method are needed to make more efficient use of peripheral device dedicated memory.

SUMMARY OF THE INVENTION

The present invention overcomes the limitations and deficiencies of previous systems by providing a system and method for recapturing dedicated peripheral device memory. The system includes a central processing unit (CPU) for executing program instructions, which is coupled to a processor bus. The system may comprise a system memory for storing program instructions and data, and a system memory controller dedicated to managing READ and WRITE operations on the system memory. The system memory controller is coupled via the processor bus to the CPU.

The system further comprises at least one peripheral system, such as a graphic display system, preferably coupled to a primary Peripheral Component Interconnect (PCI) bus or similar bus-master interconnection architecture and enabled for memory recapture. The peripheral system comprises a peripheral device, a peripheral RAM, and a peripheral controller for controlling the peripheral device and peripheral RAM.

Preferably a primary PCI bridge couples the processor bus to the primary PCI bus for controlling information transfer therebetween. More particularly, the preferred primary PCI bridge retrieves configuration information such as the amount of peripheral memory to recapture. This recapturable peripheral memory is referred to as the "shared memory portion." The remaining memory is dedicated to the peripheral device and referred to as the "dedicated memory portion."

Using known PCI conflict resolution and memory allocation routines, the preferred primary PCI bridge develops a composite memory map for the system. This composite memory map comprises addresses for the dedicated memory portion, the shared memory portion and the system memory. If, for example, an additional peripheral system is coupled to the primary PCI bus and enabled for memory recapture, the preferred primary PCI bridge determines its dedicated and shared memory portions and includes these portions in the memory map. The preferred primary PCI bridge then sends memory aperture values identifying the dedicated and shared memory portions to each peripheral controller, which uses the aperture values to intercept and service only information having an address within its memory aperture.

To access resulting memory space during runtime, the CPU need only perform normal READ/WRITE operations. If an address specifies a storage location in the peripheral memory, the preferred primary PCI bridge recognizes the address and routes the information to the primary PCI bus. Thus, the peripheral system intercepts and services the request. If an additional peripheral system is attached to an additional PCI bus via a secondary PCI bridge, the additional PCI bridge recognizes the address and routes the information to the additional PCI bus. Thus, the additional peripheral system intercepts and services the request.

The system of the present invention advantageously enables more efficient use of memory resources. Recapture of unused peripheral memory for use by other components of the system such as the CPU avoids wasting valuable RAM space. The invented system also advantageously improves system performance. The operating speed of excess peripheral semiconductor memory, accounting for all PCI access latencies, still provides faster access than known secondary non-semiconductor storage alternatives. The system also advantageously provides a continuous memory address space for managing dedicated, shared and system memory. This maintains system addressing simplicity. The system also advantageously has plug and play capability. By reading in a configuration header for each peripheral device, the memory recapture system identifies all PCI devices and independently pools all resources. Thus, the invented system creates its composite memory map without a complex input/output system or driver. Further, the system enables a unified memory architecture which avoids the need for having a system memory and a system controller since system RAM is available in the peripheral systems. This reduces system cost.

DETAILED DESCRIPTION OF THE PREFERRED EMBODIMENT

Figure 1:
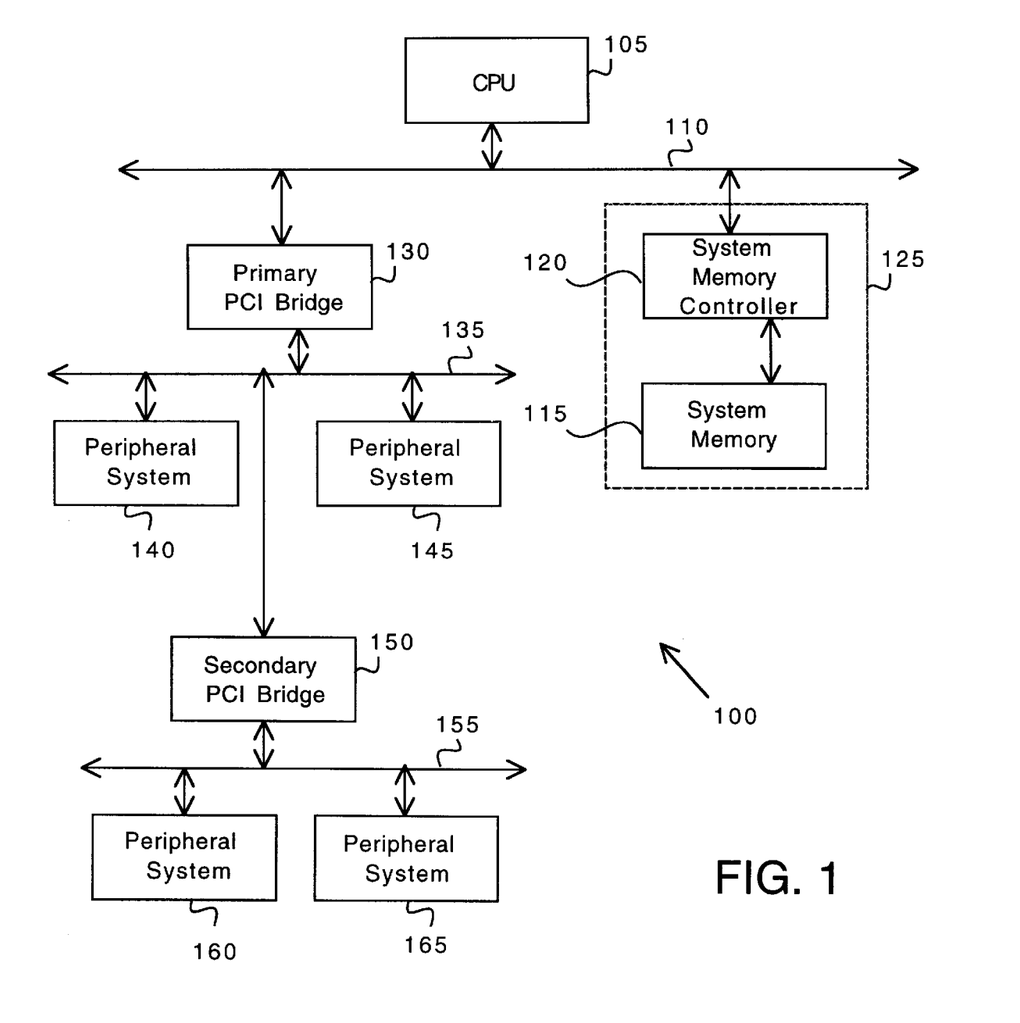
FIG. 1 is a block diagram of a computer system implementing a memory recapture function in accordance with the present invention.

FIG. 1 is a block diagram of a digital computer system 100 which implements a peripheral memory recapture function in accordance with the present invention. System 100 includes a Central Processing Unit (CPU) 105, a processor bus 110, a system memory unit 125, a preferred primary PCI bridge 130, a primary PCI bus 135 and peripheral systems 140, 145, 160 and 165.

CPU 105 executes program instructions to control system 100, including instructions for accessing data and monitoring peripheral devices. CPU 105 is preferably a Pentium® or higher class microprocessor manufactured by Intel, Inc. of Santa Clara, Calif. System memory unit 125 comprises a system memory 115 and a system memory controller 120. System memory 115 includes RAM and stores program instructions and data. System memory controller 120 is coupled via processor bus 110 to CPU 105 and regulates READ and WRITE operations on system memory 115.

Peripheral systems 140, 145, 160 and 165 are components, such as printers, plotters, terminals, monitors, graphics displays, optical scanners, image digitizers and output microfilm devices, each coupled to a primary PCI bus 135. Each of peripheral systems 140, 145, 160 and 165 may be enabled for memory recapture or else a "legacy" peripheral system. Legacy peripheral systems either do not have a dedicated memory or are not designed for performing memory recapture, and therefore are ignored during memory recapture routines. For the sake of simplicity, each of the illustrated peripheral systems 140, 145, 160 and 165 will be discussed as being enabled for memory recapture. In the preferred embodiment, one of the peripheral systems, for example system 140, is a video graphics system having a video monitor for displaying computer-generated information.

Preferred primary PCI bridge 130 couples processor bus 110 to PCI bus 135. During system 100 start-up or during a PCI power-up self-test (POST) configuration routine, preferred primary PCI bridge 130 retrieves configuration information on each peripheral system 140, 145, 160 and 165 such as the amount of memory to recapture, or "shared memory portion." The shared memory portion configuration information is preferably stored in Dual In-line Package (DIP) switches set by Original Equipment Manufacturers (OEMs). Alternatively, the configuration information may be stored in the Basic Input Output System (BIOS) of system 100, although this may impede system 100 plug and play capabilities. The amount of memory remaining is referred to as the "dedicated memory portion." The configuration information may alternatively include the dedicated memory portion or both the dedicated and shared memory portions.

In another embodiment, preferred primary PCI bridge 130 first estimates the size of the dedicated memory portion by analyzing peripheral system functions and related configuration information. For example, if peripheral system 140 is a video graphics system, preferred primary PCI bridge 130 estimates the amount of RAM needed to render and display a "worst-case" video picture by analyzing the video mode (e.g. CGA, EGA, VGA, SGA, XGA, etc.), resolution (e.g. 640×480, 800×600, 1024×768, 1280×1024) and color definition rating (e.g. 4, 8, 16 or 24 bit color). In this embodiment, preferred primary PCI bridge 130 subtracts the dedicated memory portion from the peripheral memory capacity to derive the shared memory portion. If preferred primary PCI bridge 130 determines that the shared memory portion is significant, i.e. more than one megabyte, preferred primary PCI bridge 130 enables this portion for recapture. Otherwise, preferred primary PCI bridge 130 ignores the excess memory space.

Using known PCI conflict resolution and memory allocation routines, preferred primary PCI bridge 130 develops a composite memory map which specifies system 100 address space. The memory map includes memory addresses for system memory 115 and, according to the present invention, for each shared memory portion recaptured from peripheral systems 140, 145, 160 and 165. The address space specifying each dedicated, shared or system memory space is referred to as a "memory aperture." The memory apertures are sent to respective peripheral systems 140, 145, 160 and 165 and system memory unit 125. A PCI memory aperture, which is defined as the combination of all attached peripheral system memory apertures, is used by preferred primary PCI bridge 130 during runtime to control information exchange between processor bus 110 and primary PCI bus 135.

System 100 may further comprise a secondary PCI bridge 150 for controlling information exchange between primary PCI bus 135 and a second PCI bus 155. Secondary PCI bridge 150 is allocated a memory aperture defined as a combination of all apertures of its attached peripheral system 160 and 165 memories. Secondary PCI bridge 150 enables various system 100 topologies and enables buses to run at different clock frequencies. Further, if a PCI bus such as second PCI bus 155 is accessed via multiple bridges (not shown), each peripheral system attached to that PCI bus must be registered with one of the multiple bridges. Thus, each bridge manages the READ and WRITE operations for its registered peripheral systems and thereby controls information exchange therebetween.

Preferred primary PCI bridge 130 and secondary PCI bridge 150 preferably comprise conventional PCI "glue" logic and data transfer control circuitry as embodied for example in ORION® or TRITON® PCI chipsets manufactured by Intel, Inc. of Santa Clara, Calif. Preferred primary PCI bridge 130 and secondary PCI bridge 150 functionality are dictated by the PCI Local Bus Specification Version 2.1, which is available from the PCI Special Interest Group of Portland, Oreg. The subject matter of datasheets and databooks on the above-named Intel chipsets and the subject matter of the PCI Local Bus Specification Version 2.1 are hereby incorporated by reference. The present invention leverages the PCI standard to provide an improved composite memory map which distinguishes between dedicated and shared peripheral memory spaces.

To access resulting memory space, CPU 105 need only perform normal READ and WRITE operations. If an address specifies a storage location in system memory 110, system memory controller 115 will determine that the address is within its memory aperture and then service the request. If the address specifies a storage location in a peripheral system 140, 145, 160 or 165, preferred primary PCI bridge 130 recognizes the address and routes the information to PCI bus 135. Accordingly, either peripheral system 140 or 145 intercepts and services the request, or secondary PCI bridge 150 recognizes the address and in turn routes the information to second PCI bus 155 so that peripheral system 160 or 165 intercepts and services the request. Thus, system 100 enables CPU 105 to store and retrieve information by in recaptured areas of peripheral device memories.

Figure 2:
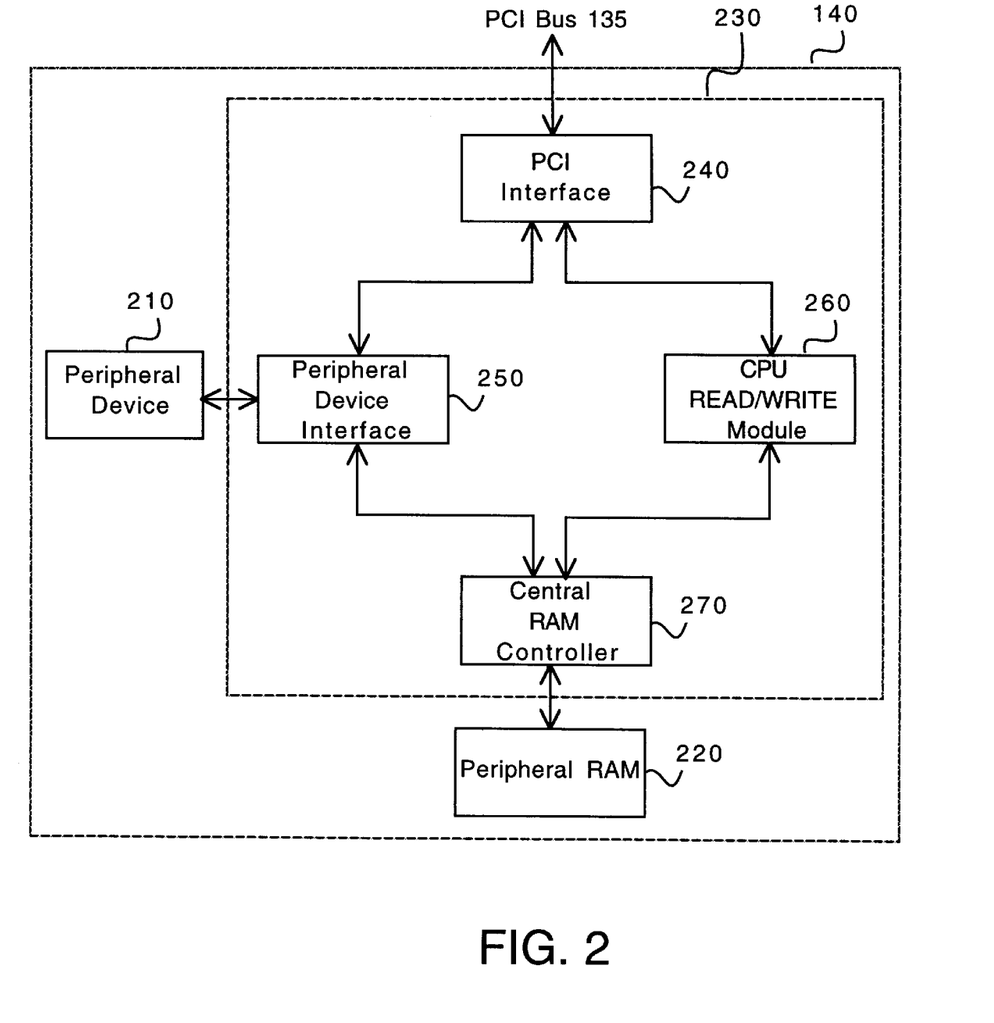
FIG. 2 is a block diagram of a peripheral system of FIG. 1.

FIG. 2 is a block diagram of an example peripheral system 140. It will be appreciated that peripheral systems 145, 160 and 165 each comprise subsystems that are coupled and operate together similarly to peripheral system 140. Peripheral system 140 comprises a peripheral device 210 such as a video display or voice synthesizer, a peripheral RAM 220 such as a video DRAM, and a peripheral controller 230 coupled to peripheral device 210, peripheral RAM 220 and primary PCI bus 135. Peripheral controller 230 acts as an interface to CPU 105 to manage access to peripheral RAM 220 and instructions for peripheral device 210. To incorporate shared memory, a peripheral controller 230 must be a multifunctional device and one of the functions must be a memory controller. Otherwise, peripheral system 140 is a legacy peripheral system.

In the preferred embodiment, peripheral system 140 is a video graphics system. Accordingly, peripheral device 210 is a video display, peripheral RAM 220 is graphics DRAM and peripheral controller 230 is a graphics controller. Graphics controller 230 regulates imaging functions such as color mapping, pixel rendition and logical display construction for the video display. Graphics controller 230 also manages memory access requests from video display 210 to the dedicated portion of graphics DRAM 220, and memory access requests from CPU 105 to the dedicated and shared portions of graphics DRAM 220. Further, graphics controller 230 manages instructions sent by CPU 105 for peripheral device 210.

Peripheral controller 230 comprises a PCI interface 240, a peripheral device interface 250, a CPU READ/WRITE module 260 and a central RAM controller 270. Peripheral device interface 250 and CPU READ/WRITE module 260 each have an input/output line coupled to PCI interface 240 and an input/output line coupled to central RAM controller 270. Peripheral device interface 250 is coupled to peripheral device 210 and central RAM controller 270 is coupled to peripheral RAM 220.

PCI interface 240 receives via bus 135 from CPU 105, and translates and acknowledges, requests for access to memory 220 and commands for peripheral device 210. Peripheral device interface 250 receives from PCI interface 240 and translates peripheral device commands addressed to peripheral device 210. Peripheral device interface 250 also manages peripheral device 210 READ and WRITE operations on the dedicated portion of peripheral RAM 220. CPU READ/WRITE module 260 receives memory access requests from CPU 105 for dedicated and shared portions of peripheral RAM 220, converts system 100 address space to peripheral RAM 220 address space, and if necessary converts CPU 105 data size to peripheral RAM 220 data size. Address and data translation enables communications between CPU 105 and peripheral RAM 220, and thus enables use of peripheral RAM 220 as logical system memory. During runtime, central RAM controller 270 receives, regulates and arbitrates between memory access requests from peripheral device interface 250 and CPU 105. If RAM 220 comprises non-static semiconductor storage such as a DRAM, central RAM controller 270 performs refresh operations.

Figure 3:
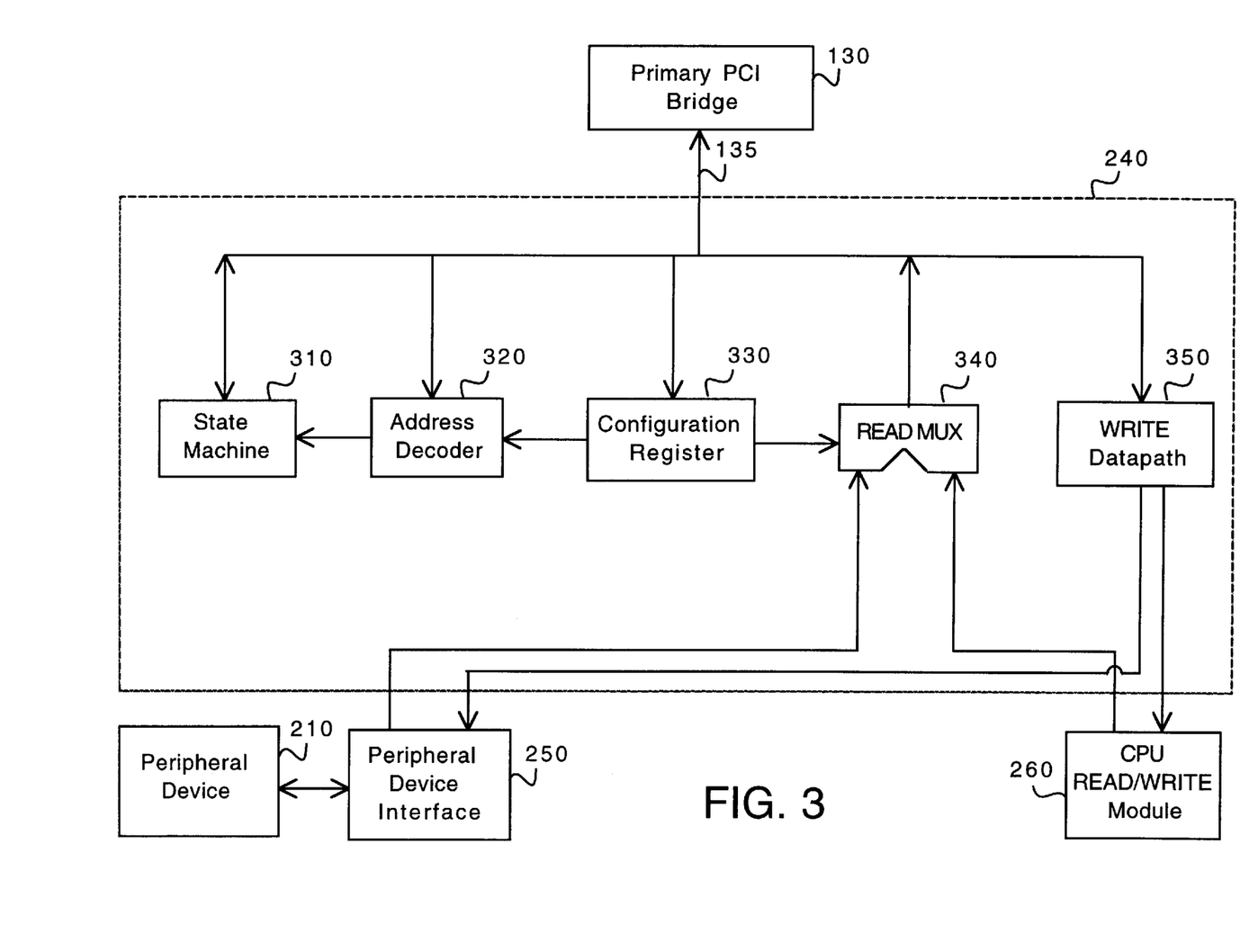
FIG. 3 is a block diagram of the PCI interface of FIG. 2.

FIG. 3 is a block diagram of PCI interface 240 which comprises a state machine 310, an address decoder 320, configuration registers 330, a READ multiplexor (MUX) 340 and a WRITE datapath 350. State machine 310 executes handshaking routines via PCI bridge 130 with CPU 105 for peripheral device 210.

Configuration registers 330 receive and store peripheral configuration information from preferred primary PCI bridge 130. This configuration information includes the type and speed of peripheral device 210, and the memory apertures corresponding to dedicated and shared memory portions of peripheral RAM 220. It will be appreciated that for an n-function peripheral controller 230, there may be n-sets of configuration registers 330. For example, there may be a set of configuration registers 330 for a graphics controller and a set for a memory controller.

During runtime, address decoder 320 receives an address from CPU 105, and determines whether the address is within a memory aperture as stored in configuration registers 330. If a CPU 105 address specifies a location in a dedicated or shared portion of peripheral RAM 220, address decoder 320 informs state machine 310 which claims the cycle. During the cycle, data is transferred between CPU 105 and peripheral RAM 220, via READ MUX 340 or WRITE datapath 350 and CPU READ/WRITE module 260. CPU READ/WRITE module 260 translates the address and data based on the memory aperture addressed. If the CPU 105 address specifies peripheral device 210, address decoder 320 informs state machine 310 which claims the cycle. During this cycle, commands and data are exchanged between CPU 105 and peripheral device 210, via READ MUX 340 or WRITE datapath 350 and peripheral device interface 250.

Figure 4:
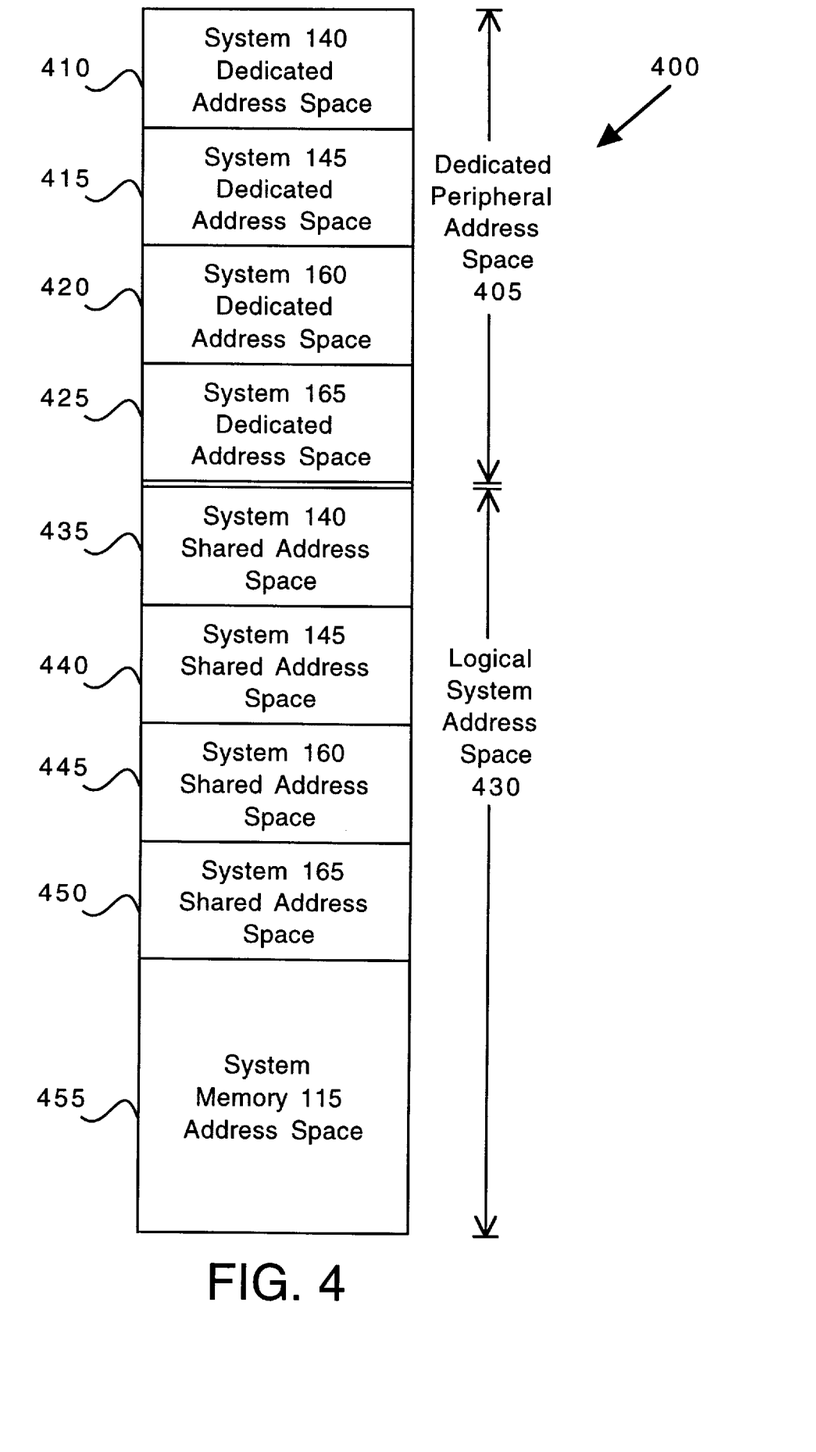
FIG. 4 is a composite memory map illustrating the function of the memory recapture system.

FIG. 4 is a representative composite memory map 400 as developed and managed by preferred primary PCI bridge 130. Map 400 comprises dedicated peripheral address space 405 and expanded logical system address space 430. Dedicated peripheral address space 405 comprises address space 410 for the dedicated portion of memory in peripheral system 140, address space 415 for the dedicated portion of memory in peripheral system 145, address space 420 for the dedicated portion of memory in peripheral system 160 and address space 425 for the dedicated portion of memory in peripheral system 165. Logical system address space 430 comprises recaptured address spaces 435, 440, 445 and 450 for respective memory portions recaptured from peripheral system 140, 145, 160 and 165 memories, and address space 455 specifying at least a portion of system memory 115. Logical system address space 430 is preferably assigned starting from the lowest available address, namely 0, and then followed by dedicated peripheral address space 405. This enables a continuous logical system address space 430.

Figure 5:
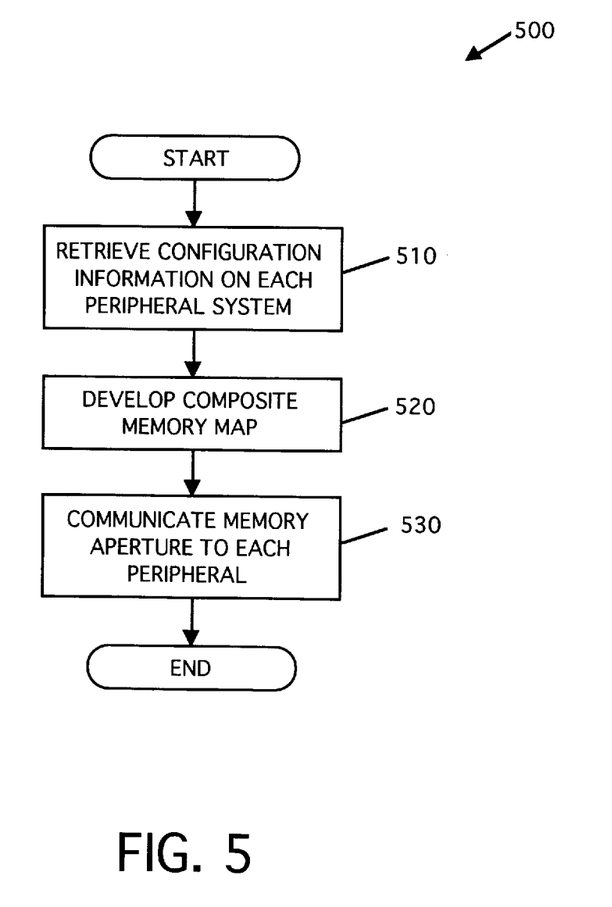
FIG. 5 is a flowchart illustrating a preferred method for recapturing unused peripheral memory.

FIG. 5 is a flowchart illustrating a preferred method 500 for recapturing unused portions of peripheral memories 140, 145, 160 and 165. Method 500 begins during a start-up or a PCI power up self-test (POST) routine by step 510 of retrieving configuration information such as the portion of peripheral memory to recapture. The configuration information is preferably stored in DIP switches set by OEMs. Based on the configuration information, the size of the dedicated memory portion can be determined. Alternatively, the configuration information may include the dedicated memory portion or both the dedicated and shared memory portions.

In step 520, preferred primary PCI bridge 130 uses PCI conflict resolution and memory allocation routines to develop a composite memory map comprising addresses for the dedicated, shared and system memories. Preferred primary PCI bridge 130 develops an expanded logical system memory space comprising shared memory portions from peripheral systems 140, 145, 160 and 165 and system memory 110. Next, preferred primary PCI bridge 130 assigns dedicated peripheral addresses for each of peripheral systems 140, 145, 160 and 165 as part of the dedicated peripheral memory address area. The address space specifying each of the dedicated, shared and system memories is referred to as a memory aperture.

In step 530, preferred primary PCI bridge 130 communicates the memory aperture to each respective peripheral controller 230 in peripheral systems 140, 145, 160 and 165 and to system memory controller 120 and secondary system bridge 150 for appropriate configuration. Method 500 then ends.

A first advantage of the present invention is more efficient use of memory resources. Because unused memory from peripheral systems 140, 145, 160 and 165 is being recaptured for use by other components of system 100, valuable RAM space is not wasted. A second advantage of the invention is improved system 100 performance. Operating speed of excess peripheral semiconductor memory, accounting for all PCI access latencies, still provides faster access than known secondary storage alternatives. A third advantage of the invention is the use of a continuous memory address space for managing dedicated, shared and system memories. This maintains system addressing simplicity. A fourth advantage of the invention is plug and play capability. By reading in each peripheral configuration header, system 100 identifies all PCI devices and independently pools their resources. Thus, system 100 creates the composite memory map without a complex input/output operating system or driver. A fifth advantage of the invention is a unified memory architecture which avoids the need for having a system memory and a system controller since system RAM is available in the peripheral systems. This reduces system cost.

The foregoing description of the preferred embodiment of the invention is by way of example only, and variations of the above-described embodiment and method are also provided by the present invention. For example, although system 100 is described as using a PCI bus model, an alternative bus model such as Microchannel®, ISA, EISA or NUBUS can be used. Second, system 100 can be implemented in a multiprocessor environment. Third, system 100 may be modified to support any number of multifunction peripherals and bridges. Fourth, system 100 can be deployed upon system startup only or repeatedly during runtime. If recapture is to be implemented during runtime, data contained in shared memories must be stored safely to avoid potential data loss.

The embodiments described herein have been presented for purposes of illustration and are not intended to be exhaustive or limiting, and many variations and modifications are possible in light of the foregoing teaching. System 100 is limited only by the following claims.

What is claimed is:

1. A computer system, having a processing unit, for recapturing peripheral memory comprising:

a system memory;

a non dedicated peripheral device in communication with the processing unit;

a peripheral memory including a dedicated portion and a shared portion, in communication with the peripheral device;

a controller for managing access by the processing unit to the shared portion; and a primary bridge for retrieving configuration information on said peripheral memory to identify the sizes of the dedicated and shared portions of the peripheral memory and to enable the shared portion for recapture, wherein said primary bridge enables a unified architecture for said system and peripheral memories to provide the computer system with plug and play capability.

2. The computer system of claim 1 wherein the peripheral device comprises a video display.

3. The computer system of claim 2 wherein the peripheral memory comprises a graphics dynamic random access memory.

4. The computer system of claim 3 wherein the controller comprises a graphics controller.

5. The computer system of claim 1 further comprising:

a configuration storage which stores the configuration information specifying the sizes of the dedicated portion and of the shared portion.

6. The computer system of claim 1 wherein said primary bridge develops a memory map specifying addresses for the dedicated and shared portions.

7. The computer system of claim 6 wherein the processing unit uses the memory map to perform READ and WRITE operations on the shared portion.

8. The computer system of claim 1 wherein said primary bridge is a primary PCI bridge, coupling the processing unit to the controller, for dividing the peripheral memory into said dedicated and shared portions.

9. The computer system of claim 8 further comprising:

a second peripheral device; and a secondary PCI bridge, coupling the primary PCI bridge to the second peripheral device.

10. A computer system for recapturing peripheral memory, comprising:

a system memory;

a non dedicated peripheral device;

a peripheral memory in communication with the peripheral device;

a peripheral controller for managing access to the peripheral memory;

means for providing configuration information specifying a portion of the peripheral memory as dedicated to the peripheral device and a portion of the peripheral memory as recapturable; and a primary bridge for retrieving configuration information on said peripheral memory to determine the sizes of the dedicated and recapturable portions of the peripheral memory and for developing a memory map specifying the dedicated portion and the recapturable portion, wherein said primary bridge enables a unified architecture for said system and peripheral memories to provide the computer system with plug and play capability.

11. The computer system of claim 10 wherein the peripheral device comprises a video display.

12. The computer system of claim 11 wherein the peripheral memory comprises a graphics dynamic random access memory.

13. The computer system of claim 12 wherein the controller comprises a graphics controller.

14. The computer system of claim 11 further comprising: a second peripheral device and a secondary bridge coupling the primary bridge to the second peripheral device.

15. The computer system of claim 10 wherein the means for providing comprises storage means, from which the primary bridge retrieves the configuration information.

16. The computer system of claim 10 wherein the primary bridge sends memory aperture information, specifying a unique address space for each of the dedicated and recapturable memory portions, to the peripheral controller.

17. The computer system of claim 16 further comprising a processing unit which performs READ and WRITE operations on the recapturable memory portion based on the memory aperture of the recapturable memory portion.

18. The computer system of claim 10 wherein the configuration information specifies the size of the dedicated and recapturable portions.

19. The computer system of claim 10 wherein the configuration information specifies the size of the dedicated portion, and the primary bridge determines the size of the recapturable portion based on the size of the dedicated portion.

20. The computer system of claim 10 wherein the primary bridge is a primary PCI bridge.

21. A method, for a computer system having a non dedicated peripheral device, a peripheral memory, a system memory, a primary bridge, and other components, using the primary bridge to recapture excess peripheral memory, comprising the steps of:
   determining a first portion of peripheral memory to be dedicated to the peripheral device;
   determining a second portion of peripheral memory available to be shared;
   creating a memory map of the first and second portions; and
   enabling a component other than the peripheral device to access the second portion; and
   enabling a unified architecture for the system and peripheral memories to provide said computer system with plug and play capability.

22. The method of claim 21 wherein the peripheral device comprises a video display.

23. The method of claim 22 wherein the peripheral memory comprises a graphics dynamic random access memory.

24. The method of claim 21 and further comprising, before the step of determining a first portion, the step of retrieving configuration information specifying the size of the first portion and of the second portion.

25. The method of claim 21 including the step of determining the size of the second portion based on the size of the first portion.

26. The method of claim 21 wherein the step of creating a memory map is performed by a PCI bridge.

27. A peripheral system memory recovery apparatus comprising:
   a processor;
   a system memory;
   a peripheral system including
      a non dedicated peripheral device; and
      a peripheral memory having
         a dedicated portion, and
         a shared portion, and
      a peripheral controller, coupled between said processor, said peripheral device and said peripheral memory for controlling said peripheral device and controlling accesses by said peripheral device to said dedicated portion and for controlling accesses by said processor to said shared portion of peripheral memory; and
   a primary PCI bridge for retrieving configuration information on said peripheral system to identify the dedicated and shared portions of the peripheral memory and to enable the shared portion for access by said processor, wherein said primary bridge enables a unified architecture for said system and peripheral memories to provide plug and play capability.

28. The apparatus of claim 27 further comprising:
   a PCI bus, wherein said primary PCI bridge and said PCI bus are together coupled between said processor and said peripheral system, and wherein said PCI bridge develops a composite memory map specifying an address space for the dedicated portion and an address space for the shared portion, and said peripheral controller uses said map in controlling accesses to said portions of peripheral memory.

29. The apparatus of claim 28 wherein said peripheral controller comprises:
   a PCI interface including
      a state machine,
      an address decoder,
      configuration registers,
      a READ multiplexor, and
      a WRITE datapath.

30. The apparatus of claim 29 wherein said peripheral controller comprises:
   a peripheral device interface,
   a CPU READ/WRITE module, and
   a RAM controller.

31. An apparatus as in claim 28 wherein said PCI bridge develops said composite memory map to also specify system memory address space.

32. An apparatus as in claim 28 and further comprising:
   a secondary PCI bridge coupled to said PCI bus,
   a secondary PCI bus coupled to said secondary PCI bridge, and
   an additional peripheral system coupled to said secondary PCI bus.

33. A method, for a computer system having a central processing unit, a system memory, a primary bridge, a configuration storage system, a non dedicated peripheral device and a peripheral memory, using the primary bridge to recapture peripheral device memory, comprising the steps of:
   storing, in the configuration storage system, configuration information specifying the size of a dedicated portion of said peripheral memory and the size of a recapturable portion of said peripheral memory;
   retrieving the configuration information during initialization of the computer system to determine the dedicated and recapturable portions of said peripheral memory;
   creating a memory map of said dedicated and recapturable portions, the addresses for each of said dedicated and recapturable portions being defined as memory aperatures;
   providing a peripheral controller for using the memory apertures in communicating with the peripheral memory;
   enabling the central processing unit to use the memory map in accessing the peripheral device memory; and
   enabling a unified architecture for said system and peripheral memories to provide the computer system with plug and play capability.

* * * * *